(12) United States Patent  
Zhu

(10) Patent No.: US 8,824,343 B2
(45) Date of Patent: Sep. 2, 2014

(54) METHOD AND SYSTEM FOR IMPLEMENTING SYNCHRONIZATION AMONG MICRO BASE STATIONS

(75) Inventor: Yun Zhu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 162 days.

(21) Appl. No.: 13/521,470

(22) PCT Filed: Oct. 26, 2010

(86) PCT No.: PCT/CN2010/078110
§ 371 (c)(1),
(2), (4) Date: Jul. 11, 2012

(87) PCT Pub. No.: WO2011/150623
PCT Pub. Date: Dec. 8, 2011

(65) Prior Publication Data
US 2013/0010658 A1 Jan. 10, 2013

(30) Foreign Application Priority Data

Jun. 3, 2010 (CN) .......................... 2010 1 0192108

(51) Int. Cl.
*H04B 7/00* (2006.01)
*H04B 7/12* (2006.01)
*H04J 3/16* (2006.01)
*H04W 56/00* (2009.01)
*H04W 92/20* (2009.01)

(52) U.S. Cl.
CPC .......... *H04W 56/0015* (2013.01); *H04W 92/20* (2013.01)
USPC ............................ 370/277; 370/347; 370/437

(58) Field of Classification Search
CPC ......... H04L 5/14; H04L 5/001; H04L 5/0046; H04L 5/0003; H04L 5/0058; H04J 3/1694; H04B 7/2643; H04B 7/2656
USPC ....................................................... 370/280
See application file for complete search history.

(56) References Cited

U.S. PATENT DOCUMENTS 8,200,239 B2* 6/2012 Mia et al. .................... 455/456.1
2008/0215951 A1* 9/2008 Oshima ......................... 714/755
(Continued)

FOREIGN PATENT DOCUMENTS

CN 101039146 A 9/2007
CN 101183898 A 5/2008
(Continued)

OTHER PUBLICATIONS

International Search Report in international application No. PCT/CN2010/078110, mailed on Mar. 10, 2011.
(Continued)

*Primary Examiner* — Faruk Hamza
*Assistant Examiner* — Abu-Sayeed Haque
(74) *Attorney, Agent, or Firm* — Oppedahl Patent Law Firm LLC

(57) ABSTRACT

The present disclosure provides a method and system for implementing synchronization among micro-base stations, including: a micro-base station intercepts a wireless reference signal of an air interface, and selects a synchronization reference object according to an intercepted wireless reference signal; and the micro-base station implements synchronization processing through detecting the wireless reference signal of the selected synchronization reference object, and adjusts its own synchronization information. The method for implementing synchronization among micro-base stations disclosed in the present disclosure is implemented on the basis of the wireless air interface signals of the micro-base stations, requires no additional synchronization hardware devices (such as Global Positioning Satellite (GPS) receiving apparatus, etc.) and has low cost. By the solution disclosed in the present disclosure, the mutual interference caused by asynchronization between a Time Division Duplex (TDD) micro-base station and other base stations is eliminated flexibly.

18 Claims, 4 Drawing Sheets

(56) References Cited

U.S. PATENT DOCUMENTS

| | | |
|---|---|---|
| 2010/0027694 A1 | 2/2010 | Touboul |
| 2010/0054237 A1 | 3/2010 | Han |
| 2010/0120447 A1* | 5/2010 | Anderson et al. .......... 455/456.1 |

FOREIGN PATENT DOCUMENTS

| | | |
|---|---|---|
| CN | 101583187 A | 11/2009 |
| JP | H5110498 A | 4/1993 |
| JP | H5235833 A | 9/1993 |
| JP | H10190562 A | 7/1998 |
| JP | 2000357988 A | 12/2000 |
| JP | 2002164837 A | 6/2002 |
| JP | 2009177532 A | 8/2009 |
| JP | 2011514716 A | 5/2011 |
| JP | 2012506653 A | 3/2012 |
| WO | 2009099809 A2 | 8/2009 |
| WO | 2010048899 A1 | 5/2010 |

OTHER PUBLICATIONS

English Translation of the Written Opinion of the International Search Authority in international application No. PCT/CN2010/078110, mailed on Mar. 10, 2011.

* cited by examiner

METHOD AND SYSTEM FOR IMPLEMENTING SYNCHRONIZATION AMONG MICRO BASE STATIONS

TECHNICAL FIELD

The present disclosure relates to the technology of apparatus synchronization, in particular to a method and system for implementing synchronization among Time Division Duplex (TDD) micro-base stations.

BACKGROUND

Along with the development of a wireless communication technology, the base stations in a cellular network gradually develop towards the direction of miniaturization, low power consumption and low cost. For example, recently invented micro-base stations, such as a Home Base Station (Home NodeB) and a Micro-Base Stations (Pico NodeB) are the representatives in this aspect. In the cellular network, indoor coverage is provided mainly by numerous plug-and-play micro-base station apparatuses and serves as the supplementation of normal macro-cell coverage; in the other aspect, from the perspective of users, the appearance of micro-base stations provides preferential high-speed wireless access services for a user, and it is very convenient and affordable.

Like a normal macro-base station, the micro-base stations are divided into TDD micro-base stations and Frequency Division Duplex (FDD) micro-base stations according to different wireless duplex implementation ways.

A TDD wireless network has a strict requirement on time synchronization among base stations. Therefore, normal TDD macro-base stations are usually installed with synchronization devices, such as Global Positioning System (GPS) or Big Dipper or the like to ensure mutual high-precision synchronization. Considering the cost of micro-base stations, synchronization devices are less likely to be installed, and crystal oscillators of the micro-base stations are generally low-cost products, which will generate great error after used for a period of time. Consequentially, high-precision synchronization between a micro-base station and a macro-base station and between micro-base stations cannot be guaranteed in a current practical application, which no doubt results in a great distance from the synchronization requirement of the TDD wireless network. What is more, since serious interference will be generated when signals are transmitted among asynchronous base stations, a receiving apparatus cannot identify correct signals and the system performance is lowered seriously.

SUMMARY

On that account, the main purpose of the present disclosure is to provide a method and system for implementing synchronization among micro-base stations to satisfy the requirements from a TDD wireless network on time synchronization among base stations without increasing the cost, thereby ensure that a receiving apparatus can identify a correct signal and improving the system performance.

In order to achieve the purpose, the technical solution of the present disclosure is implemented as follows.

A method for implementing synchronization among micro-base stations includes pre-setting synchronization information in a micro-base station; and the method further includes:

intercepting a wireless reference signal of an air interface and selecting a most precise synchronization reference object according to an intercepted wireless reference signal by the micro-base station, wherein the most precise synchronization reference object is a synchronization reference object having minimum error with a clock of a Global Navigation Satellite System (GNSS); and implementing synchronization processing by the micro-base station through the wireless reference signal of the selected synchronization reference object.

In said solution, the synchronization information may include a synchronization state value or may include a synchronization state value and a self-synchronization indication value.

The micro-base station may determine the most precise synchronization reference object through the synchronization information.

In said solution, the selecting a most precise synchronization reference object may include:

when a synchronous signal from a satellite is intercepted, selecting the satellite as the synchronization reference object; otherwise, when a wireless reference signal from a macro-base station is intercepted, selecting the macro-base station as the synchronization reference object; otherwise, when a wireless reference signal from other micro-base stations is intercepted, selecting a micro-base station with a self-synchronization indication value No as the synchronization reference object from the intercepted micro-base station and the micro-base station; when there are two or more than two micro-base stations with the self-synchronization indication value No, selecting a micro-base station with a minimum synchronization state value as the synchronization reference object from the two or more than two micro-base stations.

In said solution, the selecting a most precise synchronization reference object may include:

when a synchronous signal from a satellite is intercepted, selecting the satellite as the synchronization reference object.

In said solution, the selecting a synchronization reference object may include:

when a wireless reference signal from a macro-base station is intercepted, selecting the macro-base station as the synchronization reference object.

In said solution, the method may further include: when two or more than two macro-base stations are intercepted, selecting a macro-base station with strongest signal intensity or best signal quality as the synchronization reference object.

In said solution, the selecting a synchronization reference object may include:

when a wireless reference signal from a micro-base station is intercepted, selecting the synchronization reference object from the intercepted micro-base station and the micro-base station according to the self-synchronization indication value.

In said solution, the selecting a synchronization reference object according to the self-synchronization indication value may include: selecting a micro-base station with a self-synchronization indication value No as the synchronization reference object; and when all self-synchronization indication values are not No, selecting a micro-base station with a self-synchronization indication value Yes as the synchronization reference object.

In said solution, the method may further include: when two or more than two micro-base stations are for selection, selecting a micro-base station with a minimum synchronization state value as the synchronization reference object from the two or more than two micro-base stations.

In said solution, the method may further include: when there are two or more than two micro-base stations with the minimum synchronization state value, selecting a macro-base station with strongest signal intensity or best signal quality as the synchronization reference object from the two or more than two micro-base stations.

In said solution, the signal intensity or signal quality may be represented by Received Signal Code Power/Reference Signal Receiving Power (RSCP/RSRP).

In said solution, the method may further include: when no synchronization reference object can be found, the micro-base station regards itself as the synchronization reference object.

In said solution, when the synchronization reference object is a satellite or a macro-base station, the micro-base station adjusts its own synchronization information may be that the micro-base station sets its own self-synchronization indication value as No and sets its own synchronization state value to a minimum value.

In said solution, when the synchronization reference object is a satellite or a macro-base station and the macro-base station is provided with a synchronization state value by itself, the micro-base station adjusts its own synchronization information may be that the micro-base station sets its own self-synchronization indication value as No and sets its own synchronization state value as the synchronization state value of the micro-base station plus 1.

In said solution, when the synchronization reference object is another adjacent micro-base station, the micro-base station adjusts its own synchronization information may be that the micro-base station sets its own self-synchronization indication value as same as a self-synchronization indication value of the adjacent micro-base station that serves as the synchronization reference object, and sets its own synchronization state value as the synchronization state value of the adjacent micro-base station that serves as the synchronization reference object plus one.

In said solution, when the synchronization reference object is another adjacent micro-base station and the adjacent micro-base station serving as the synchronization reference object has a maximum synchronization state value, the micro-base station adjusts its own synchronization information may be that the micro-base station sets its own self-synchronization indication value as No and sets its own synchronization state value to a minimum value.

In said solution, when the micro-base station regards itself as the synchronization reference object, the micro-base station adjusts its own synchronization information may be that the micro-base station sets its own self-synchronization indication value as Yes and sets its own synchronization state value to a minimum value.

In said solution, the micro-base station may further store an adjacent cell list and/or a synchronization adjustment period.

In said solution, the method may further include: implementing the interception, synchronization processing and synchronization information adjustment by the micro-base station when it is started up or every other synchronization adjustment period.

In said solution, the wireless reference signal may be one or any combination of following synchronous signals on a wireless channel: a satellite signal; a primary synchronous signal, a secondary synchronous signal and a reference signal of a Time Division Duplexing-Long Term Evolution (TDD-LTE) system; as well as a Downlink Synchronization Code (SYNC-DL) and a Midamble code of a Time Division-Synchronous Code Division Multiple Access (TD-SCDMA) system.

A system for implementing synchronization among micro-base stations at least includes a micro-base station that is internally pre-set with synchronization information and is configured to intercept a wireless reference signal of an air interface, select a synchronization reference object according to an intercepted wireless reference signal, implement synchronization processing through a wireless reference signal of the selected synchronization reference object, and adjust its own synchronization information.

In said solution, the system may further include one or more macro-base stations, configured to be intercepted by the micro-base station as an adjacent cell(s) and serve(s) as a candidate synchronization reference object(s) of the micro-base station.

It can be seen from the technical solution provided in the present disclosure that a micro-base station intercepts a wireless reference signal of an air interface, selects a synchronization reference object according to an intercepted wireless reference signal, implements synchronization processing through the wireless reference signal of the selected synchronization reference object and adjusts its own synchronization information. The method for implementing the synchronization among the micro-base stations disclosed by the present disclosure is implemented on the basis of the wireless air interface signals of micro-base stations, requires no additional synchronization hardware devices (such as a GPS receiving apparatus, etc.) and has low cost. By the solution disclosed in the present disclosure, the mutual interference caused by asynchronization between a TDD micro-base station and other base stations is eliminated flexibly.

DETAILED DESCRIPTION

This disclosure relates TDD micro-base stations, such as micro-base stations in a TD-SCDMA system, a TDD-LTE system, and etc.

Figure 1:
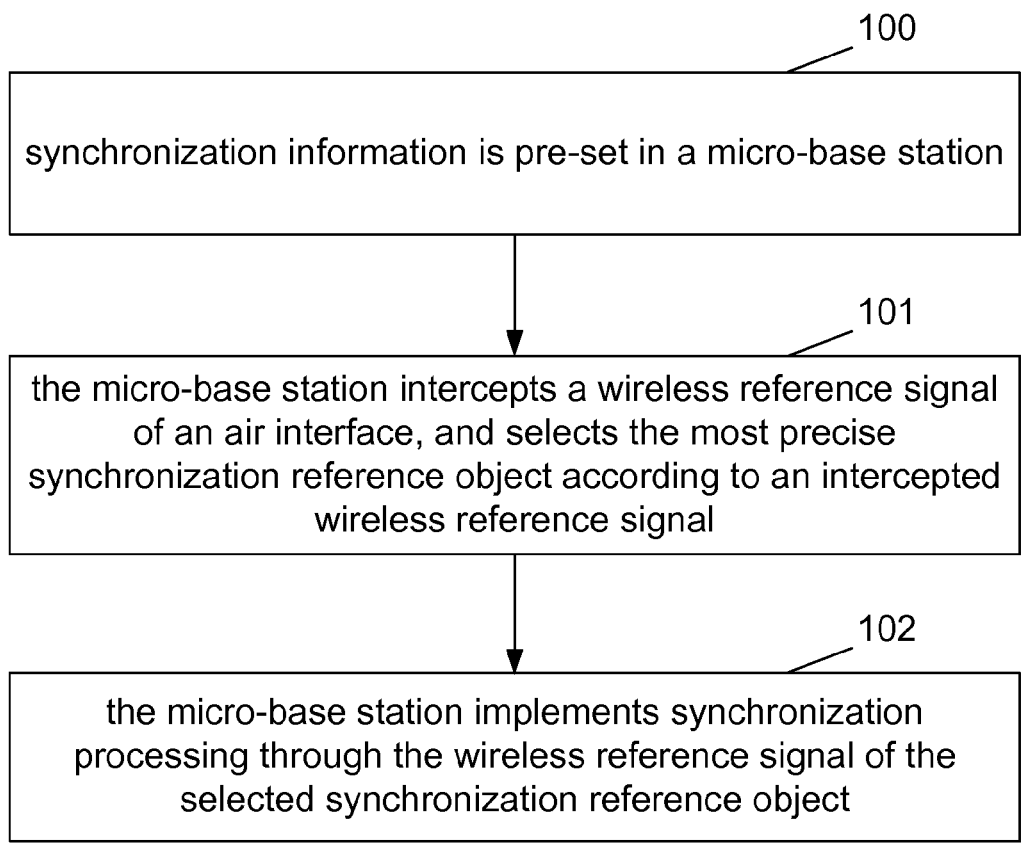
FIG. 1 shows a flowchart of a method for implementing synchronization among micro-base stations in the present disclosure.

FIG. 1 shows a flowchart of a method for implementing synchronization among micro-base stations in the present disclosure; and as shown in FIG. 1, the method includes the following steps:

Step 100, synchronization information is pre-set in a micro-base station, wherein the synchronization information includes a synchronization state value, or includes a synchronization state value and a self-synchronization indication value for indicating whether it is self-synchronized; and in a practical application, two registers are generally needed inside the micro-base station to respectively store the synchronization state value and the self-synchronization indication value.

the synchronization state value can be represented by several bits; when all the bits are set as 0, it corresponds to the minimum value (equal to 0); when all bits are set as 1, it corresponds to the maximum value (MAX). The self-synchronization indication value can be presented by 0 and 1; for example, 0 represents Yes and 1 represents No or on the contrary. The initial value of the synchronization state value can be set as 0 and the initial value of the self-synchronization indication value can be set as Yes.

Furthermore, the micro-base station can internally store information such as an adjacent cell list, a synchronization adjustment period or the like, wherein the adjacent cell list is for storing frequency information of an adjacent cell of the micro-base station before the micro-base station is shut down last time, so that the micro-base station can rapidly find the adjacent cell when started up again.

Step 101, the micro-base station intercepts a wireless reference signal of an air interface, and selects a most precise synchronization reference object according to an intercepted wireless reference signal.

Here, the most precise synchronization reference object is a synchronization reference object having minimum error with the clock of GNSS.

The micro-base station starts synchronization through intercepting the wireless reference signal of the air interface after being started up or in each synchronization adjustment period. Here, the wireless reference signal may be one or any combination of the following synchronous signals on a wireless channel: a signal from a satellite; a primary synchronous signal, a secondary synchronous signal and/or a reference signal of a TDD-LTE system; as well as a Downlink Synchronization Code (SYNC-DL) and/or a Midamble code of a TD-SCDMA system; or the like. In this step, the method for intercepting a wireless reference signal of an air interface by a micro-base station belongs to the technical means commonly used by those skilled in the field. A plurality of solutions have been disclosed, and no detail is given here any longer. When the micro-base station intercepts the air interface, it is possible to intercept a plurality of synchronous signals or no reference signal. What this step emphasizes is that there exists priority when a synchronous signal is selected as the reference object; and the specific implementation is as follows:

when a synchronous signal from a satellite is intercepted, firstly preferentially selecting the synchronous signal of the satellite as the reference signal, that is to say, selecting the satellite as the synchronization reference object;

when a wireless interference signal from a macro-base station is intercepted, secondly preferentially selecting the wireless interference signal of the macro-base station as the reference signal, namely selecting the macro-base station as the synchronization reference object; furthermore, if wireless reference signals from a plurality of macro-base stations are intercepted, selecting the macro-base station with strongest signal intensity or best signal quality as the synchronization reference object, wherein in a practical engineering application, the signal intensity or the signal quality is generally represented by Received Signal Code Power/Reference Signal Receiving Power (RSCP/RSRP);

when the micro-base station intercepts no wireless reference signal from a satellite or a macro-base station, but intercepts wireless reference signals from other micro-base stations, that is to say, the micro-base station can intercept other micro-base stations, preferentially selecting the synchronization reference object according to a self-synchronization indication value in synchronization information, that is, thirdly preferentially selecting a micro-base station with a self-synchronization indication value No as the synchronization reference object from the other intercepted micro-base stations and itself; only when none of the self-synchronization indication values are No, selecting a micro-base station with a self-synchronization indication value Yes as the synchronization reference object;

on the basis of satisfying with the third priority, when there is a plurality of micro-base stations for selection, selecting a micro-base station with a minimum synchronization state value as the synchronization reference object; furthermore, when there is still a plurality of micro-base stations which serve as synchronous sources for selection, selecting a macro-base station with strongest signal intensity or best signal quality as the synchronization reference object.

There is a special case, that is, when a synchronization state value of an intercepted micro-base station has reached a preset maximum value, the micro-base station cannot serve as the synchronization reference object;

in this step, the micro-base station selects the most precise synchronization reference object based on an intercepted wireless interference signal may also be:

only intercepting a synchronous signal from a satellite, and selecting the satellite as the synchronization reference object when a synchronous signal from the satellite is intercepted; or only intercepting a wireless reference signal from a macro-base station, and selecting the macro-base station as the synchronization reference object when a wireless reference signal from the macro-base station is intercepted;

furthermore, when two or more than two macro-base stations are intercepted, selecting a macro-base station with the strongest signal intensity or best signal quality as the synchronization reference object from the two or more than two macro-base stations; or only intercepting wireless reference signals from other micro-base stations, and selecting a micro-base station with a self-synchronization indication value No as the synchronization reference object from the intercepted micro-base stations and itself; and when none of the self-synchronization indication values are No, selecting a micro-base station with a self-synchronization indication value Yes as the synchronization reference object;

when there is a plurality of micro-base stations with same self-synchronization indication values for selection, selecting a micro-base station with the minimum synchronization state value from the micro-base stations as the synchronization reference object; and furthermore, when there are two or more than two micro-base stations with minimum synchronization state values, selecting a macro-base station with strongest signal intensity or best signal quality as the synchronization reference object from the two or more than two micro-base stations.

Step 102, the micro-base station implements synchronization processing through the wireless reference signal of the synchronization reference object selected in the Step 101.

After the reference object for the synchronization is determined, the micro-base station implements the synchronization processing through detecting the reference signal of the synchronization reference object, including: adjusting the slot time of the micro-base station and controlling a crystal oscillator circuit so as to realize time synchronization with the reference object. The specific implementation of the synchronization processing belongs to the technology commonly known by the technicians in the field, therefore, no detail is given here any longer. The reference signal of the synchronization reference object here may be one or any combination of the following synchronous signals on a wireless channel that are mentioned in the Step 101, including, a satellite signal; a primary synchronous signal, a secondary synchronous signal and/or a reference signal of a TDD-LTE system; and SYNC-DL and/or Midamble code of a TD-SCDMA system; or the like.

It should be noted that, the micro-base station, after being synchronized with the synchronization reference object, further needs to adjust its own synchronization information (i.e. the synchronization state value and the self-synchronization indication value);

when the synchronization reference object is a satellite or a macro-base station, the micro-base station sets its own self-synchronization indication value as No and sets its own synchronization state value to a minimum value, for example, 0; or when the macro-base station is provided with a synchronization state value by itself, the micro-base station sets its own synchronization state value as the synchronization state value of the macro-base station plus 1.

It is important to note that the synchronization state value indicates the number of jumps experienced by the micro-base station and the most precise synchronous source (the satellites or the micro-base stations) in order to realize synchronization; the minimum value can be preset and defined manually, for example, can be set as 0 or 1.

when the synchronization reference object is another adjacent micro-base station, the micro-base station sets its own self-synchronization indication value as same as the self-synchronization information of the adjacent micro-base station that serves as the synchronization reference object and sets the synchronization state value as the synchronization state value of the adjacent micro-base station serving as the synchronization reference object plus 1.

There is an exceptional case, that is, when the synchronization state value of the adjacent micro-base station serving as the synchronization reference object has been the maximum value, the micro-base station sets its own self-synchronization indication value as No and sets its own synchronization state value to the minimum value.

when no synchronous signal from other base stations is intercepted, that is, there is no synchronization reference object in the adjacent base stations, the micro-base station sets its own self-synchronization indication value as Yes and sets its own synchronization state value to the minimum value.

The method of the present disclosure further comprises: the micro-base station needs to initialize its own synchronization information when started up: setting its own self-synchronization indication value as Yes and setting its own synchronization state to the maximum value.

The method for implementing synchronization among micro-base stations disclosed by the present disclosure is implemented on the basis of wireless air interface signals of a micro-base station, requires no additional synchronization hardware devices and has low cost. By the solution disclosed by the present disclosure, the mutual interference caused by asynchronization between a TDD micro-base station and other base stations is eliminated flexibly.

Figure 2:
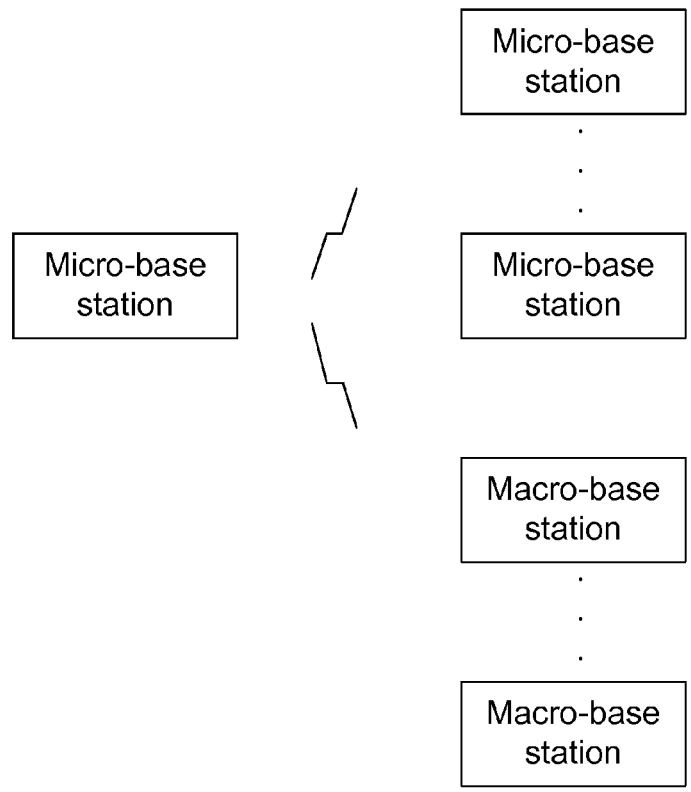
FIG. 2 shows a schematic diagram of the structure of a system for implementing synchronization among micro-base stations in the present disclosure.

Corresponding to the method of the present disclosure, a system for implementing synchronization among micro-base stations is further provided. FIG. 2 shows a schematic diagram of a system for implementing synchronization among micro-base stations in the present disclosure; and the system at least includes a micro-base station that is internally pre-set with synchronization information and is configured to intercept a wireless reference signal of an air interface, select a synchronization reference object according to an intercepted wireless reference signal, implement synchronization processing through a wireless reference signal of the selected synchronization reference object, and adjust its own synchronization information.

The device of the present disclosure further includes one or more macro-base stations configured to be intercepted by the micro-base station as an adjacent cell(s) and serve as a candidate synchronization reference object(s) of the micro-base station.

The method of the present disclosure is described below with reference to several specific embodiments in detail.

Figure 3:
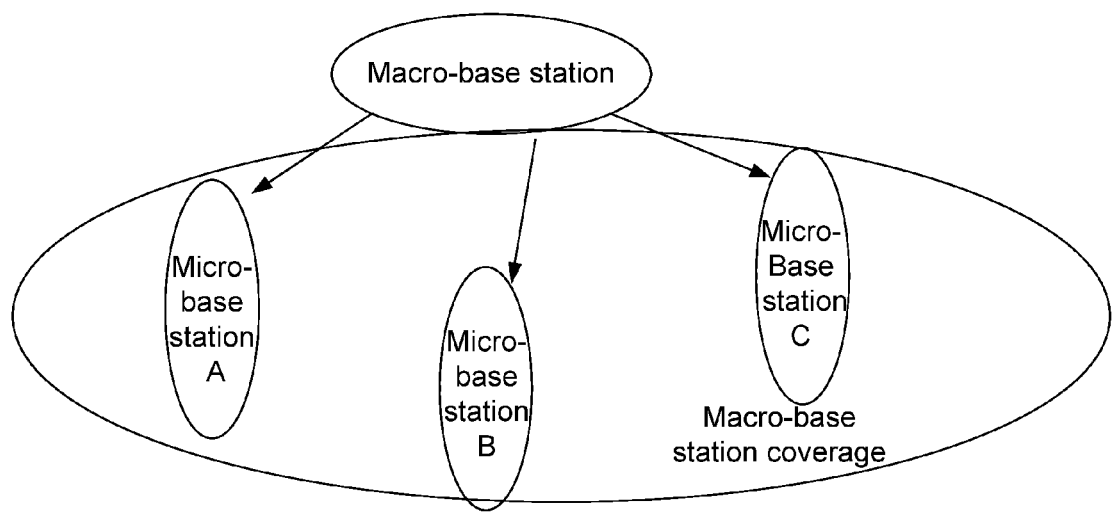
FIG. 3 shows a schematic diagram of an embodiment in which a micro-base station network within macro-base station coverage implements synchronization in the present disclosure.

FIG. 3 shows a schematic diagram of an embodiment in which a micro-base station network implements synchronization in macro-base station coverage in the present disclosure; and as shown in FIG. 3, taking micro-base station A as an example, the micro-base station A after started up performs the following synchronization steps and repeats the steps every other adjustment period. Here, the adjustment period can be pre-set manually by users of system network management apparatuses or micro-base stations or set by a micro-base station based on calculation according to its own crystal oscillator error level and synchronization precision requirements.

Firstly, the micro-base station A scans a adjacent cell frequency list stored in itself and intercepts adjacent base stations involving transmission of synchronization reference signals. Here, the frequency list is configured by the system network manager according to the current location of the micro-base station A, or is a frequency list supported by the hardware of the micro-base station A and is stored by the micro-base station A before the last shutdown of the micro-base station A. The information of the frequency list at least includes the main working frequency of an adjacent base station of the micro-base station A and a unique cell identifier corresponding to the adjacent base station of the micro-base station A. Furthermore, the micro-base station A can divide the base stations corresponding to the frequencies in the frequency list into macro-base stations and micro-base stations, so the frequency list is divided into a frequency list of the adjacent macro-base stations and a frequency list of the adjacent micro-base stations.

In the embodiment, providing that the micro-base station A can intercept a synchronization reference signal of a macro-base station rather than a signal from a satellite, therefore, in accordance with the method for selecting a synchronization reference object in the present disclosure, the micro-base station A regards the macro-base station as the synchronization reference object (note: the micro-base station A can also intercept synchronous signals from the micro-base station B and the micro-base station C.). In addition, if the micro-base station A at this moment also can intercept synchronization reference signals from the other macro-base stations, for example, it can intercept reference signals from macro-base station 1, micro-bas station 2 and micro-base station 3 at the same time (for simple illustration, such case is not shown in FIG. 3), then the micro-base station A selects the macro-base station with strongest signal intensity or best signal quality as the synchronization reference object. In a practical engineering application, the signal intensity or the signal quality is generally represented by RSCP, RSRP values.

Then, the micro-base station A detects the synchronization reference signal of the synchronization object, i.e. the synchronization reference signal of a macro-base station, wherein for the TDD-LTE system, the synchronization reference signal may be a primary synchronous signal, a secondary synchronous signal and/or a reference signal; and for the TD-SCDMA system, the synchronization reference signal may be a SYNC-DL and/or a Midamble code, or the like. The method for detecting these reference signals can adopt multiple traditional known technologies, which belongs to the technical means commonly used by the technicians in the field, therefore no detail is given here any longer.

Then, the micro-base station A compares its own clock according to the signal detection result, then adjusts its own crystal oscillator frequency and the slot time. The micro-base station A sets its own self-synchronization indication value as No and sets its own synchronization state value to a value to enable itself to be directly synchronized with the macro-base station. Preferably, in a practical engineering application, a variable register below is adopted to realize the setting:

providing that the self-synchronization indication value is represented by a variable Self-synchronized, 1 is pre-set to represent Yes and 0 represents No. In the embodiment, providing that the Self-synchronized of the micro-base station A is equal to 0, the synchronization state value is represented by the register with several bits in the apparatus; the corresponding variable is supposed as Strata: the bits which are 0 correspond to the minimum value of the Strata (equal to 0); and the bits which are 1 correspond to the maximum value (MAX) of the Strata.

Providing that the Strata of the macro-base station is set as 0 during the system initialization, the micro-base station A in the embodiment sets its own Strata to 1 when it is started up; and providing that the system has not set the Strata value of the macro-base station during the initial configuration, the micro-base station A in the embodiment sets its own Strata to 0 when started up.

In the embodiment where synchronization is implemented by the micro-base station network in the macro-base station coverage as shown in FIG. 3, the micro-base station A performs the synchronization steps above when started up and at each adjustment period so as to establish (or keep) the synchronization between the micro-base station A and the macro-base station. In addition, the micro-base station A also can require a selection method (also called a priority order) of the synchronization reference object through configuration files (or a configuration list), wherein the configuration files can be sent from operators to the micro-base station A through Over The Air (OTA) or managed through Operation Administration and Maintenance (OAM).

Figure 4:
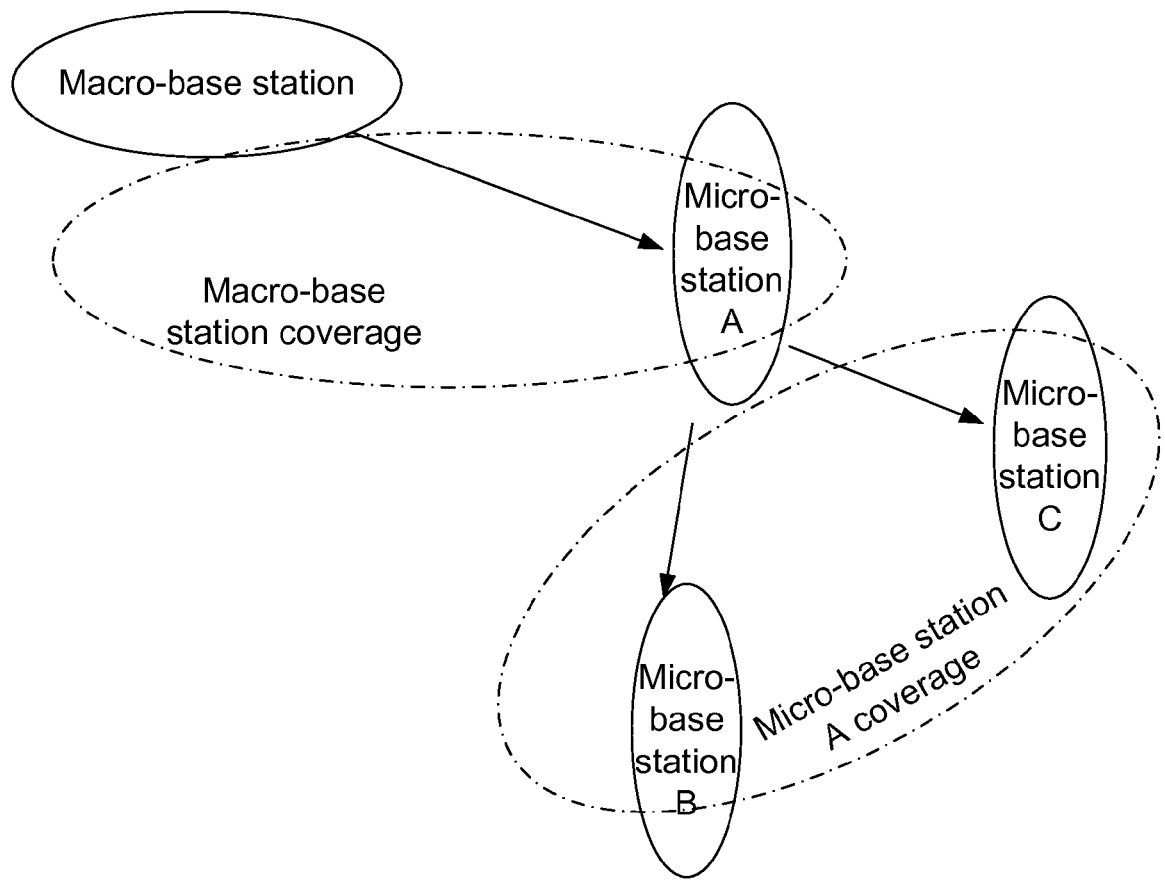
FIG. 4 shows a schematic diagram of an embodiment in which a micro-base station network within macro-base station coverage implements synchronization in the present disclosure.

FIG. 4 shows a schematic diagram of an embodiment in which a micro-base station network implements synchronization in macro-base station coverage in the present disclosure; and as shown in FIG. 4, providing that the micro-base station B and the micro-base station C are not in the coverage of the macro-base station, they can intercept a synchronous signal from the micro-base station A. Consequentially, in order to realize time synchronization among base stations in the TDD network, the embodiment is realized in this way:

firstly, the micro-base station A is synchronized with the macro-base station according to the method described in the last embodiment: providing that the micro-base station A after started up intercepts a synchronization reference signal of the macro-base station, then synchronizes with the macro-base station, keeps the synchronization in each adjustment period and sets its own Self-synchronized=0 and Strata=1;

the process for implementing synchronization by the micro-base station B comprises the following steps:

the micro-base station B intercepts synchronization reference signals of adjacent base stations according to a frequency list of adjacent cells; in the embodiment, providing that the micro-base station B can intercept synchronization reference signals from the micro-base station A and the micro-base station C, the micro-base station B selects the micro-base station A as the synchronization reference object according to the is synchronization reference object selection method described in FIG. 1 because the Self-synchronized of the micro-base station A is equal to 0. Furthermore, if the micro-base station B at this moment can intercept multiple reference signals from micro-base stations with Self-synchronized=0 and Strata=1, the micro-base station B selects the macro-base station with best signal quality (maximum RSCP and RSRP values) as the synchronization reference object. It should be noted here that:

micro-base stations, when started up, set their respective self-synchronization indication values and synchronization state values as Self-synchronized=Yes and Strata=MAX and set the time length of the adjustment period initialization. Such setting can avoid possible error occurrence caused by a micro-base station, in the coverage of a justly started-up micro-base station, which regards the justly started-up micro-base station as the synchronization reference object.

The method for a micro-base station to obtain the self-synchronization indication value and the synchronization state value of an adjacent base station is as follows: a macro-base station or a micro-base station of an adjacent cell broadcasts its own self-synchronization indication value or synchronization state value through a system message, and the micro-base station obtains the value through receiving the system message; or, a network side stores self-synchronization indication values or synchronization state values of all the base stations and sends information of possible adjacent cells to the micro-base station according to the location of the micro-base station; or the micro-base station stores a self-synchronization indication value or a synchronization state value of an adjacent cell when the micro-base station is shut down last time.

Then, the micro-base station B detects the synchronization reference signal from the micro-base station A, and adjusts its own crystal oscillator frequency and slot time. In this embodiment, the micro-base station B sets its own self-synchronization indication value as No and sets its synchronization state value as the synchronization state value of the micro-base station A+1, that is to say, the self-synchronization indication value of the micro-base station B is Self-synchronized_B=0; and the synchronization state of the micro-base station B is Strata_B=Strata_A+1=2.

In addition, the micro-base station B keeps synchronization with the micro-base station A in each adjustment period. Similarly, the process of implementing synchronization between the micro-base station C and the micro-base station A is as same as that of synchronization between the micro-base station B and the micro-base station A, here no detail is given any longer. Furthermore, when there are other micro-base station in the coverage of the micro-base station B (or micro-base station C), the micro-base station regards the micro-base station B (or micro-base station C) as the synchronization reference object; and the Strata of the micro-base station is Strata=Strata_B+1. The adjacent micro-base station with minimum Strata is preferably selected for synchronization so that air interface synchronous transmission error obtained by a micro-base station which newly joins the synchronization is lowest.

As shown in FIG. 4, since a micro-base station is User Equipment, the micro-base station A may leave from the original location due to user reasons (such as turning off the power source, changing the location, and etc.). At this moment, the micro-base station B and the micro-base station C will lose the original synchronous source. If the micro-base station B or the micro-base station C can intercept other non-self-synchronization micro-base stations, then the micro-base station B or the micro-base station C is synchronized with an intercepted micro-base station. It is easy for the technicians in the field to realize the specific implementation, here no detail is given. If there is no other non-self-synchronization micro-base station which can be synchronous, then the micro-base station B and the micro-base station will compete with each other to become a new synchronous source, and form a non-self-synchronization network.

Figure 5:
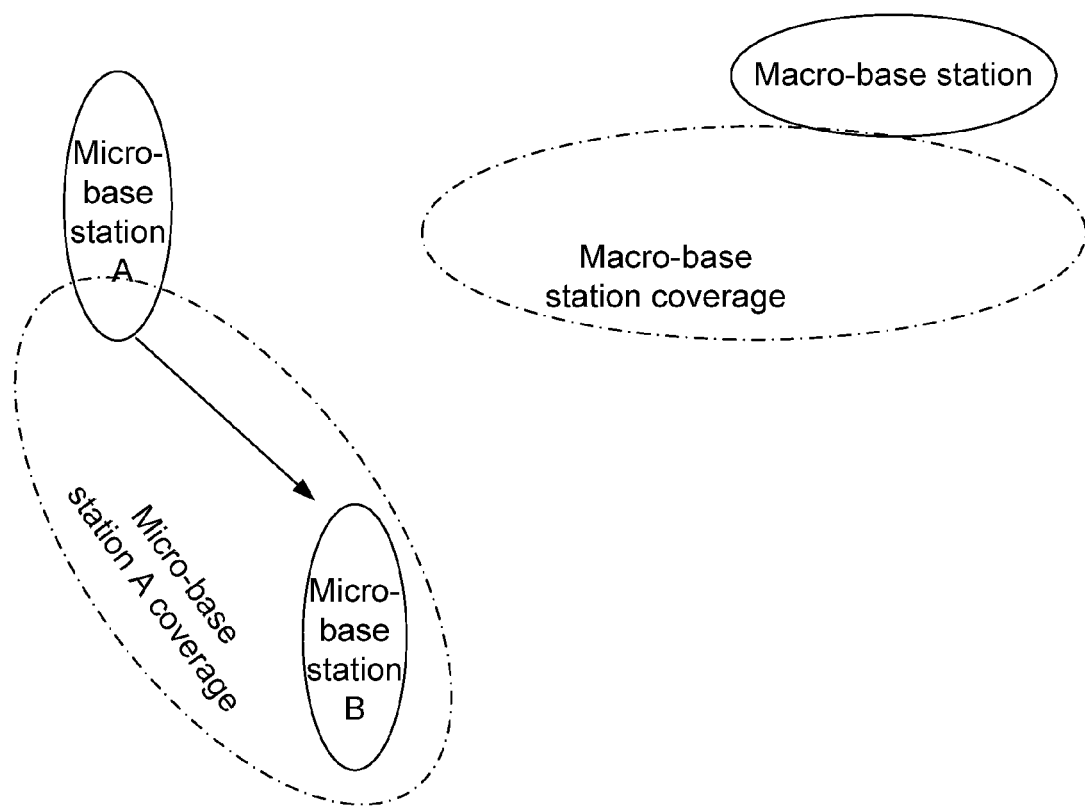
FIG. 5 shows a schematic diagram of an embodiment in which an independent micro-base station network implements synchronization.

FIG. 5 shows a schematic diagram of an embodiment in which an independent micro-base station network implements synchronization; and as shown in FIG. 5, providing that the micro-base station A is started up earlier than the micro-base station B, the embodiment is as follows:

firstly, the micro-base station A is initialized after started up and sets its own Self-synchronized=1 (representing Yes) and Strata=MAX;

then, the micro-base station A intercepts A synchronization reference signal of an adjacent base station, wherein in the embodiment, the micro-base station A can not intercept any signal that can be synchronous, therefore the micro-base station A regards itself as the synchronization reference object (called a synchronous source). The micro-base station A keeps its own slot time and crystal oscillator frequency and sets Self-synchronized=1, Strata=1 (or 0, according to the initial setting of a system or user);

then the micro-base station B is started up;

then the micro-base station B is initialized after started up and sets Self-synchronized=1 (representing Yes) and Strata=MAX.

The micro-base station B intercepts a synchronization reference signal from an adjacent base station, and at this moment, the micro-base station B can intercept the synchronization reference signal of the micro-base station A. In accordance with the method for selecting a synchronization reference object described in FIG. 1, the micro-base station B selects the micro-base station A as the synchronization reference object in view of the synchronization state of the micro-base station A less than that of the micro-base station B.

Finally, the micro-base station B detects the synchronization reference signals from the micro-base station A, adjusts its own slot time and crystal oscillator frequency on the basis of the synchronization reference signal so as to synchronize with the micro-base station A: setting the Self-synchronized and Strata of the micro-base station B as Self-synchronized=1 (representing Yes, namely self-synchronization) and Strata=Strata_A+1. Then, the micro-base station B keeps synchronization with the micro-base station A in each adjustment period.

The above are only the preferred embodiments of the present disclosure and not intended to limit the scope of protection of the present disclosure. Any modifications, equivalent substitutes, improvements or the like within the spirit and principle of the present disclosure shall fall within the scope of protection of the present disclosure.

The invention claimed is:

1. A method for implementing synchronization among micro-base stations, comprising presetting synchronization information in a micro-base station, and further comprising:
   intercepting a wireless reference signal of an air interface and selecting a most precise synchronization reference object according to an intercepted wireless reference signal by the micro-base station, wherein the most precise synchronization reference object is a synchronization reference object having minimum error with a clock of a Global Navigation Satellite System (GNSS); and
   implementing synchronization processing by the micro-base station through the wireless reference signal of the selected synchronization reference object;
   wherein the synchronization information comprises a synchronization state value or comprises a synchronization state value and a self-synchronization indication value; and the micro-base station determines the most precise synchronization reference object through the synchronization information; and the selecting a most precise synchronization reference object comprises:
   when a synchronous signal from a satellite is intercepted, selecting the satellite as the synchronization reference object; otherwise,
   when a wireless reference signal from a macro-base station is intercepted, selecting the macro-base station as the synchronization reference object; otherwise,
   when a wireless reference signal from other micro-base stations is intercepted, selecting a micro-base station with a self-synchronization indication value No as the synchronization reference object from the intercepted micro-base station and the micro-base station; when there are two or more than two micro-base stations with the self-synchronization indication value No, selecting a micro-base station with a minimum synchronization state value as the synchronization reference object from the two or more than two micro-base stations.

2. The method according to claim 1, wherein the selecting a most precise synchronization reference object comprises:
   when a synchronous signal from a satellite is intercepted, selecting the satellite as the synchronization reference object.

3. The method according to claim 1, wherein the selecting a synchronization reference object comprises:
   when a wireless reference signal from a macro-base station is intercepted, selecting the macro-base station as the synchronization reference object.

4. The method according to claim 1, wherein the selecting a synchronization reference object comprises:
   when a wireless reference signal from a micro-base station is intercepted, selecting the synchronization reference object from the intercepted micro-base station and the micro-base station according to the self-synchronization indication value.

5. The method according to claim 4, wherein the selecting the synchronization reference object according to the self-synchronization indication value comprises: selecting a micro-base station with a self-synchronization indication value No as the synchronization reference object; and
   when all self-synchronization indication values are not No, selecting a micro-base station with a self-synchronization indication value Yes as the synchronization reference object.

6. The method according to claim 5, further comprising: when there are two or more than two micro-base stations for selection, selecting a micro-base station with a minimum synchronization state value as the synchronization reference object from the two or more than two micro-base stations.

7. The method according to claim 6, further comprising:
   when there are two or more than two micro-base stations with the minimum synchronization state value, selecting a macro-base station with strongest signal intensity or best signal quality as the synchronization reference object from the two or more than two micro-base stations.

8. The method according to claim 1, further comprising: when no synchronization reference object can be found, the micro-base station regards itself as the synchronization reference object.

9. The method according to claim 1, wherein when the synchronization reference object is a satellite or a macro-base station, the micro-base station adjusts its own synchronization information is that the micro-base station sets its own self-synchronization indication value as No and sets its own synchronization state value to a minimum value.

10. The method according to claim 1, wherein when the synchronization reference object is a satellite or a macro-base station and the macro-base station is provided with a synchronization state value by itself, the micro-base station adjusts its own synchronization information is that the micro-base station sets its own self-synchronization indication value as No and sets its own synchronization state value as the synchronization state value of the micro-base station plus 1.

11. The method according to claim 1, wherein when the synchronization reference object is another adjacent micro-base station, the micro-base station adjusts its own synchronization information is that the micro-base station sets its own self-synchronization indication value as same as a self-synchronization indication value of the adjacent micro-base station that serves as the synchronization reference object, and sets its own synchronization state value as a synchronization state value of the adjacent micro-base station that serves as the synchronization reference object plus one.

12. The method according to claim 1, wherein when the synchronization reference object is another adjacent micro-base station and the adjacent micro-base station serving as the synchronization reference object has a maximum synchronization state value, the micro-base station adjusts its own synchronization information is that the micro-base station sets its own self-synchronization indication value as No and sets its own synchronization state value to a minimum value.

13. The method according to claim 1, wherein when the micro-base station regards itself as the synchronization reference object, the micro-base station adjusts its own synchronization information is that the micro-base station sets its own self-synchronization indication value as Yes and sets its own synchronization state value to a minimum value.

14. The method according to claim 1, wherein the micro-base station further stores an adjacent cell list and/or a synchronization adjustment period.

15. The method according to claim 14, further comprising: implementing the interception, synchronization processing and synchronization information adjustment by the micro-base station when it is started up or every other synchronization adjustment period.

16. The method according to claim 1, wherein the wireless reference signal is one or any combination of following synchronous signals on a wireless channel: a satellite signal; a primary synchronous signal, a secondary synchronous signal and a reference signal of a Time Division Duplexing-Long Term Evolution (TDD-LTE) system; as well as a Downlink Synchronization Code (SYNC-DL) and a Midamble code of a Time Division-Synchronous Code Division Multiple Access (TD-SCDMA) system.

17. A system for implementing synchronization among micro-base stations, at least comprising one micro-base station that is internally pre-set with synchronization information and is configured to intercept a wireless reference signal of an air interface, select a most precise synchronization reference object according to an intercepted wireless reference signal, and implement synchronization processing through a wireless reference signal of the selected synchronization reference object;

wherein the synchronization information comprises a synchronization state value or comprises a synchronization state value and a self-synchronization indication value; and the micro-base station determines the most precise synchronization reference object through the synchronization information; and the selecting a most precise synchronization reference object comprises:

when a synchronous signal from a satellite is intercepted, the micro-base station is configured to select the satellite as the synchronization reference object; otherwise, when a wireless reference signal from a macro-base station is intercepted, the micro-base station is configured to select the macro-base station as the synchronization reference object; otherwise, when a wireless reference signal from other micro-base stations is intercepted, the micro-base station is configured to select a micro-base station with a self-synchronization indication value No as the synchronization reference object from the intercepted micro-base station and the micro-base station; when there are two or more than two micro-base stations with the self-synchronization indication value No, the micro-base station is configured to select a micro-base station with a minimum synchronization state value as the synchronization reference object from the two or more than two micro-base stations.

18. The system according to claim 17, further comprising one or more than one macro-base stations, configured to be intercepted by the micro-base station as an adjacent cell(s) and serve(s) as a candidate synchronization reference object(s) of the micro-base station.

* * * * *